US006952561B1

(12) United States Patent
Kumar et al.

(10) Patent No.: US 6,952,561 B1
(45) Date of Patent: Oct. 4, 2005

(54) ENHANCED METRIC FOR BIT DETECTION ON FADING CHANNELS WITH UNKNOWN STATISTICS

(75) Inventors: Sarath Kumar, Bangalore (IN); Pantelis Monogioudis, Edison, NJ (US); Kiran M Rege, Marlboro, NJ (US); Ashwin Sampath, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 529 days.

(21) Appl. No.: 09/651,849

(22) Filed: Aug. 31, 2000

(51) Int. Cl.[7] ............................. H04B 1/00; H04B 15/00
(52) U.S. Cl. ................. 455/63.1; 455/67.7; 455/67.11; 455/226.2; 455/67.13; 375/130; 375/148; 370/317; 370/335; 370/342
(58) Field of Search .................. 455/63, 67.3, 67.1, 455/226.2, 63.1, 67.13, 67.11, 67.7; 375/130, 375/148, 341, 346, 349; 370/317, 335, 342, 370/441

(56) References Cited

U.S. PATENT DOCUMENTS

| | | | | |
|---|---|---|---|---|
| 6,078,626 A | * | 6/2000 | Ramesh | 375/262 |
| 6,088,324 A | * | 7/2000 | Sato | 370/203 |
| 6,157,687 A | * | 12/2000 | Ono | 375/347 |
| 6,192,040 B1 | * | 2/2001 | Jalloul et al. | 370/335 |
| 6,201,954 B1 | * | 3/2001 | Soliman | 455/226.2 |
| 6,377,607 B1 | * | 4/2002 | Ling et al. | 375/130 |
| 6,381,290 B1 | * | 4/2002 | Mostafa et al. | 375/350 |
| 6,393,257 B1 | * | 5/2002 | Holtzman | 455/67.3 |

OTHER PUBLICATIONS

A. Sampath and S. Kumar, "Analysis of Pilot symbol assisted modulation systems with power control and diversity", Proceedin of Vehicular Technology Conference, Amsterdam, the Netherlands, Sep. 1999.*
A. Sampath and S. Kumar, "Analysis of Pilot Symbol Assisted Modulation (PSAM) Systems with Power Control and Diversity"; Proceedings of Vehicular Technology Conference (VTC)—Fall, Amsterdam, The Netherlands, Sep. 1999.
H. L. Van Trees "Detection, Estimation , and Modulation Theory—Part I", Wiley and Sons, 1968, pp. 86,87,92 96.

* cited by examiner

Primary Examiner—Stephen D'Agosta

(57) ABSTRACT

A universal mobile telecommunications system (UMTS) receiver uses Pilot Symbol Assisted Modulation (PSAM) in demodulating a received Binary Phase Shift Keying (BPSK) signal. The UMTS receiver uses a ratio of the transmitted energy per pilot symbol to the transmitted energy per data symbol as an index into a look-up table to return a value for a scale factor for use in demodulation of the received signal, which provides better performance during periods when the fading distribution is unknown.

20 Claims, 5 Drawing Sheets

FIG. 3

| $\sqrt{\beta}$ | Scale Factor |
|---|---|
| 0.066667 | 2.242991 |
| 0.133333 | 2.364532 |
| 0.2 | 1.983471 |
| 0.266667 | 1.635434 |
| 0.333333 | 1.371429 |
| 0.4 | 1.173594 |
| 0.466667 | 1.02252 |
| 0.533333 | 0.904381 |
| 0.6 | 0.809899 |
| 0.666667 | 0.732824 |
| 0.733333 | 0.668862 |
| 0.8 | 0.61499 |
| 0.866667 | 0.569032 |
| 0.933333 | 0.529384 |
| 1 | 0.494845 |

Scale Factor Look-up Table

ENHANCED METRIC FOR BIT DETECTION ON FADING CHANNELS WITH UNKNOWN STATISTICS

FIELD OF THE INVENTION

This invention relates generally to communications and, more particularly, to wireless systems.

BACKGROUND OF THE INVENTION

Binary Phase Shift Keying (BPSK) is a popular modulation scheme wherein information bits are encoded as +1 or −1. For channels where the main source of signal distortion is through additive white Gaussian noise (AWGN), the optimal (in terms of minimum error probability) operations to be performed at the receiver are well known. However, in a typical wireless channel, such a transmitted signal undergoes distortion due to fading and path loss in addition to additive noise and interference.

Such fading channels are characterized not only by rapid amplitude and phase variations but also time and/or frequency dispersion. This poses a problem in the demodulation of phase or frequency modulated signals. The fading channel causes rapid changes in the phase thus making it very difficult to infer the phase of the received signal from the modulated data symbols. Different solutions for this problem have been used in second and third generation wireless systems. These include non-coherent detection, differential detection, pilot signal and pilot symbol assisted schemes. While each scheme provides a mechanism for either not requiring knowledge of the exact phase at the receiver or inferring it more accurately, there is an associated loss in performance. For example, non-coherent and differential modulation result in an increase in the required signal-to-noise ratio (SNR) compared to coherent schemes; pilot signal based schemes lead to a loss in power available for the information bits; and pilot symbol based schemes lead to a loss in bandwidth and power available for information bits.

Of the above-mentioned solutions, Pilot Symbol Assisted Modulation (PSAM) has received much attention in recent years. PSAM will be part of the wideband CDMA (Code Division Multiple Access) standard of the universal mobile telecommunications system (UMTS) being studied by the 3$^{rd}$ Generation Partnership Project (3GPP). (3GPP is a standards body comprising the European Telecommunication Standards Institution (ETSI) and several other international standards bodies.)

The basic idea behind PSAM is to periodically insert symbols known to the receiver in the information bit stream. If the pilot symbols are inserted often enough, they can be used to estimate the channel fading conditions and therefore can be used to coherently (i.e., with knowledge of the phase rotation introduced by the channel) demodulate the information bits. Since pilot symbols are corrupted by noise, the estimates of the fading conditions are not exact and hence the available information is insufficient to determine the optimal receiver. If the statistics (probability density function, in particular) of the fading are known, then one can derive the optimal operations to be performed at the receiver for detecting the transmitted bit. The form of such a receiver is known in the art. Unfortunately, when nothing is known about the fading statistics, or fading distribution, (as is typically the case) then this form of the receiver no longer provides an optimal solution.

SUMMARY OF THE INVENTION

In a wireless receiver, demodulation of a received signal involves the generation of a log-likelihood ratio (LLR) for each received bit. This is performed in accordance with a scale factor, which is determined as a function of a ratio of energy components of the transmitted signal.

In an embodiment of the invention, a UMTS receiver uses PSAM in demodulating a received BPSK signal. The UMTS receiver uses a single column look-up table (excluding index) to provide a scale factor for use in demodulation of the received signal. In particular, a ratio of the transmitted energy per pilot symbol to the transmitted energy per data symbol provides an index into the look-up table to return a value for the scale factor, which provides better performance during periods when the fading distribution is unknown.

BRIEF DESCRIPTION OF THE DRAWING

FIG. 3 shows an illustrative look-up table in accordance with the principles of the invention;

DETAILED DESCRIPTION

Figure 1:
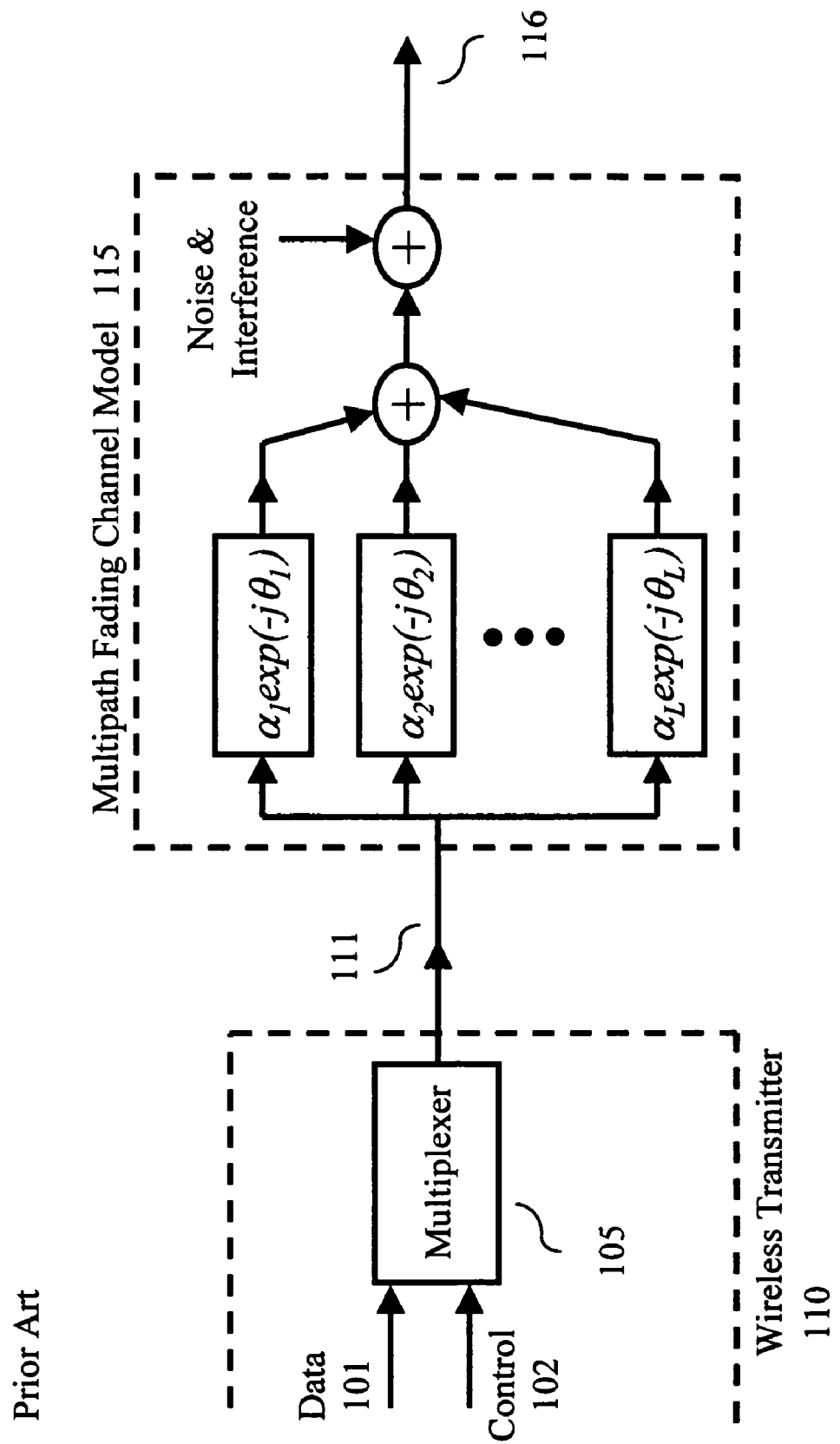
FIG. 1 illustrates a prior art transmitter and multipath fading model.

FIG. 1 illustrates a prior art transmitter and multipath fading model for use in a CDMA-based system such as UMTS. The representations shown in FIG. 1 are well-known and will not be described herein. It is assumed that a BPSK modulation scheme is used, wherein information bits are encoded as +1 or −1. Wireless Transmitter 110 comprises multiplexer 105, which forms, from a data signal 101 (representing a sequence of data symbols) and a control signal 102 (representing a sequence of pilot symbols and other control information, such as a ratio β (defined below)), a PSAM signal 111 for transmission. As known in the art, PSAM signal 111 is subject to fading, noise and interference. These effects are represented by multipath fading model channel 115, which operates on PSAM signal 111 to provide wireless signal 116 for reception by a wireless receiver. (It should be observed that wireless transmitter 110 represents either endpoint of a wireless connection, e.g., a base station or a terminal.)

Before continuing, the following definitions are made:

i—subscript, denoting the multipath index; wherein $1 \leq i \leq L$; where L is the number of multipaths;

$E_P$—the transmitted energy per pilot symbol;

$E_D$—the transmitted energy per data symbol;

$\sigma_{N_i}^2$=noise variance in the received data symbols on the i$^{th}$ multipath;

$\sigma_{Z_i}^2$=noise variance in the filtered (or averaged) pilot symbols received on the i$^{th}$ multipath;

$\mathbf{r}_I$—a vector quantity representing the inphase data component of the data portion of the received signal;

$\mathbf{r}_Q$—a vector quantity representing the quadrature data component of the data portion of the received signal;

$\mathbf{p}_I$—a vector quantity representing the inphase components of the pilot symbols;

$\mathbf{p}_Q$—a vector quantity representing the quadrature components of the pilot symbols;

$\hat{P}_I$—a vector quantity representing filtered (or averaged) inphase components of the channel estimates (obtained from received pilot symbols);

$\hat{P}_Q$—a vector quantity representing filtered (or averaged) quadrature components of the channel estimates (obtained from received pilot symbols);

$\underline{\sigma}_N^2$=a vector quantity representing the noise variance in the received data symbols over the multipaths; and $\Lambda(\underline{r}, \hat{p})$—the log likelihood ratio (LLR), the magnitude of which represents the confidence the receiver has in detecting that bit, and the sign of which indicates whether the hypothesis that the bit is +1 is more likely or if −1 is more likely (after observing the channel output).

In addition, the following ratios are defined:

$$\beta = \frac{E_P}{E_D}; \text{ and} \tag{1}$$

$$G_i = \frac{\sigma_{Z_i}^2}{\sigma_{N_i}^2}, \text{ where, } i \text{ denotes the } i^{th} \text{ multipath} \tag{2}$$

Finally, $\underline{G}$—a vector quantity representing the ratio of the noise variance in the received pilot symbols over the multipaths to the noise variance in the received data symbols over the multipaths. As used herein (and described below), G is the same for all multipaths by design.

As noted above, when the fading distribution is unknown, then an optimal procedure for bit detection does not exist. In this case, and in accordance with the invention, a suboptimal receiver can be derived applying a known statistical technique called the Generalized Likelihood Ratio Test (GLRT). In accordance with the invention, the log-likelihood ratio (LLR) is then written as:

$$\Lambda(\underline{r}, \hat{p}) = \sum_{i=1}^{L} \frac{(r_i^I \hat{p}_i^I + r_i^Q \hat{p}_i^Q) \frac{\sqrt{E_D}}{\sigma_{N_i}^2} \frac{\sqrt{E_P}}{\sigma_{Z_i}^2}}{\left[\frac{\sqrt{E_D}}{\sigma_{N_i}^2} + \frac{\sqrt{E_P}}{\sigma_{Z_i}^2}\right]} \tag{3}$$

$$= \sum_{i=1}^{L} \frac{(r_i^I \hat{p}_i^I + r_i^Q \hat{p}_i^Q)}{\sigma_{N_i}^2} \frac{\sqrt{\beta}}{(\beta + G_i)}.$$

With unknown fading statistics, and in accordance with the invention, the following scaling factor is defined for each i multipath:

$$w_i = \frac{\sqrt{\beta}}{\sigma_{N_i}^2 (\beta + G_i)}. \tag{4}$$

Thus, equation (3) becomes:

$$\Lambda(\underline{r}, \hat{p}) = \sum_{i=1}^{L} (r_i^I \hat{p}_i^I + r_i^Q \hat{p}_i^Q) w_i. \tag{5}$$

In an uncoded system, the LLR is simply compared to 0 to determine if the bit is +1 or −1. In a system that employs either convolutional or Turbo decoding, $\Lambda(\underline{r}, \hat{p})$ is passed to the decoder. As noted above, the magnitude of $\Lambda(\underline{r}, \hat{p})$ represents the confidence the receiver has in detecting that bit and the sign of $\Lambda(\underline{r}, \hat{p})$ indicates whether the hypothesis that the bit is +1 is more likely or if −1 is more likely (after observing the channel output). In systems (such as UMTS) where the scaling factor could differ for bits within an encoded block, ignoring the scaling would result in improper representation of the relative confidence that the receiver has in the bits. Consequently, the performance, and observed bit error rate, of Turbo decoders and soft decision convolutional decoders would be degraded. In accordance with the invention, the correct scaling factor is determined as a function of system parameters. For a UMTS-based system, $\beta$ is illustratively determined based on control channel information in accordance with equation (1), and $\sigma_{N_i}^2$ can be determined in any of a variety of ways. (For example, $\sigma_{N_i}^2$, may be estimated from received pilot symbols using well-known variance estimation methods or, alternatively, may be inferred from an automatic gain controller (AGC) operating point.)

For example, consider the uplink of a UMTS based system as an illustration. On the uplink, the base station receiver (e.g., receiver 200 of FIG. 2, described further below) has automatic gain control (AGC) circuitry (not shown) that tries to keep the total received power at the input to the RAKE receiver close to a fixed value, say $P_R$, which is a known system parameter. Consequently, in this particular case, the noise variance in received data symbols, $\sigma_{N_i}^2$, can be closely approximated by:

$$\sigma_{N_i}^2 = \sigma_N^2 = 2KN_C^D P_R; \tag{6}$$

where $N_C^D$ is the spreading factor associated with the data symbols and K is a system gain, both known parameters.

The noise variance in the filtered pilot symbols, $\sigma_{Z_i}^2$, too, can be closely approximated by:

$$\sigma_{Z_i}^2 = \sigma_Z^2 = 2gKN_C^P P_R; \tag{7}$$

where $N_C^P$ is the spreading factor associated with the pilot symbols (a known parameter) and g is a noise suppression factor associated with the filtering/averaging operation performed on the pilot symbols. For instance, if the filtered pilot symbols are produced by simply calculating the average of $N_P$ consecutive pilot symbols, then $$g = \frac{1}{N_P}.$$

Note that equations (6) and (7) imply that the noise variance in data and filtered pilot symbols is independent of the multipath index i. As a consequence, $$G_i = G = \frac{gN_C^P}{N_C^D}; \tag{8}$$

so that the weighting factor, $w_i$, can be written as:

$$w_i = w = \frac{\sqrt{\beta}}{\sigma_N^2(\beta + G)}; \qquad (9)$$

which is also independent of the multipath index, i, and the number of multipaths, L. For a given G (which depends on known system parameters and the data and pilot symbol rates, the latter via $N_C^D$ and $N_C^P$, respectively), there is, and in accordance with the invention, a common weight factor for all multipaths, which is a function of the energy ratio, $\beta$, above. (This may be contrasted with the weighting factors one comes across in literature, which are typically based on the assumption that the fading distribution is known. These weighting factors additionally require the knowledge of the number of multipaths being received and the relative strength of each multipath.)

Figure 2:
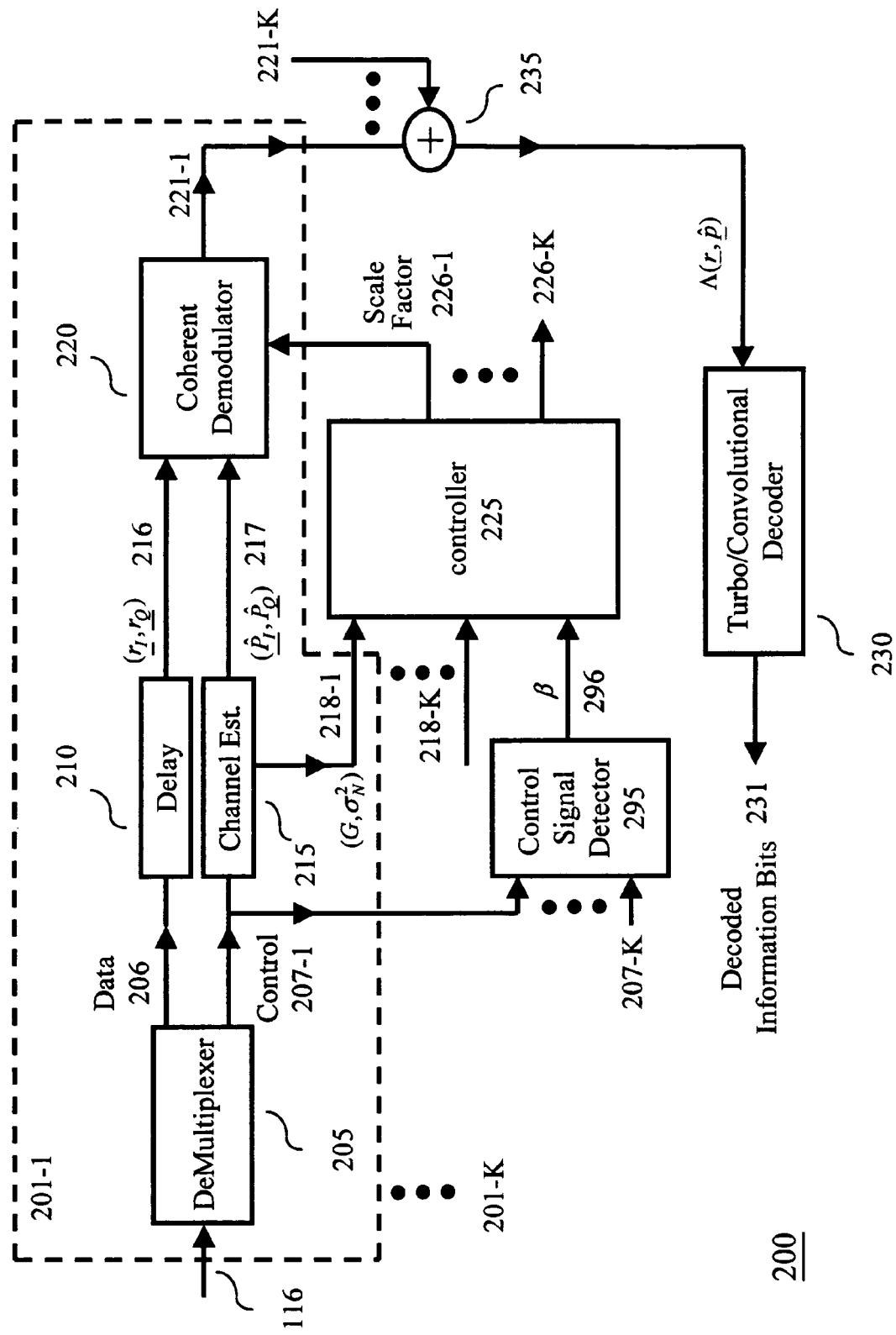
FIG. 2 shows a block diagram of a receiver in accordance with the principles of the invention.

A portion of a wireless receiver 200 (hereafter referred to as receiver 200) in accordance with the principles of the invention is shown in FIG. 2. (It should be observed that the various forms of the wireless receivers described herein represent either endpoint of a wireless connection, e.g., a base station or a terminal.) Other than the inventive concept, the elements shown in FIG. 2 are well-known and will not be described in detail. For example, controller 225 is representative of a stored-program-controlled processor with associated memory (not shown) as known in the art. Also, only that portion of receiver 200 related to the inventive concept is shown, e.g., other processing by receiver 200 of the received signal is not described. Further, a detailed description of the receiving and demodulation of a wireless signal is not necessary for the inventive concept and, as such, has been simplified. (For example, the received signal must also be de-interleaved.) In a wireless system, a RAKE receiver finger locks onto and demodulates one of the L multipaths. The outputs of all RAKE receiver fingers are combined and then fed to the turbo/convolutional decoder (not shown).) In the context of the inventive concept, a RAKE receiver finger is represented by element 201-1. Other RAKE receiver fingers are similar and are not described herein. As such, receiver 200 comprises a number of RAKE receiver fingers (as represented by elements 201-1 through 201-K), controller 225, combiner 235, control signal detector 295 and turbo/convolutional decoder 230. Element 201-1 further comprises demultiplexer 205, delay element 210, channel estimation element 215 and coherent demodulator 220.

Wireless signal 116 is received by demultiplexer 205. As noted above, wireless signal 116 represents the transmitted PSAM signal 111 as affected by fading, interference and noise (if any). Demultiplexer 205 demultiplexes the received wireless signal 116 to provide a data signal 206 (representing a sequence of data symbols) and a control signal 207-1 (which comprises a sequence of pilot symbols and other information, such as the above-mentioned $\beta$). The data signal 206 is applied to delay element 210, which delays the data signal as known in the art to provide a sequence of data symbols 216, comprising inphase and quadrature components as represented by ($\underline{r}_I$, $\underline{r}_Q$). Similarly, control signal 207-1 is applied to channel estimation element 215. The latter processes the control signal to provide an appropriate delay to the pilot portion of control signal 207 ($\underline{p}_I$, $\underline{p}_Q$) (not shown), which are further processed by channel estimation element 215 through suitable filtering/averaging techniques to produce a sequence of channel estimates ($\hat{P}_I$, $\hat{P}_Q$) represented by signal 217. In addition, channel estimation element 215 uses other control information to provide a signal(s) 218-1 representing values for the following parameters: G and $\sigma_N^2$, to controller 225. Control signal 207-1 (along with the control signals from the other fingers) is also applied to control signal detector 295, which combines all fingers to provide one value of $\beta$ to controller 225, via signal 296. (Often, channel estimation element 215 and control signal detector 295 comprise a stored-program based processor for performing the above-mentioned computations.) In accordance with the invention, demodulation of the received signal is performed as a function of the scale factor as represented by equation (9). In particular, controller 225, in accordance with equation (9), determines the scale factor, the value of which is provided to coherent demodulator 220 via signal 226-1. Coherent demodulator 220 provides the LLR ($\Lambda(\underline{r}, \hat{p})$) as a function of the scale factor (in accordance with equation (5)), via signal 221-1, for use by turbo/conventional decoder 230, which provides decoded information bit stream 231. (Alternatively, equation (4) could be used, wherein channel estimation element 215 and control signal detector 295 use other control information to provide a signal(s) 218-1 and 296 representing values for the following parameters: $\beta$, $\underline{G}$ and $\underline{\sigma}_N^2$, to controller 225.) As can be observed from FIG. 2, controller 225 provides a scale factor for use by each finger of the wireless receiver (as represented by signals 226-1 through 226-K). The output signals of each finger (221-1 through 221-K) are combined by combiner 235 for forming a combined $\Lambda(\underline{r}, \hat{p})$ for use by turbo/convolutional decoder 230.

Figure 4:
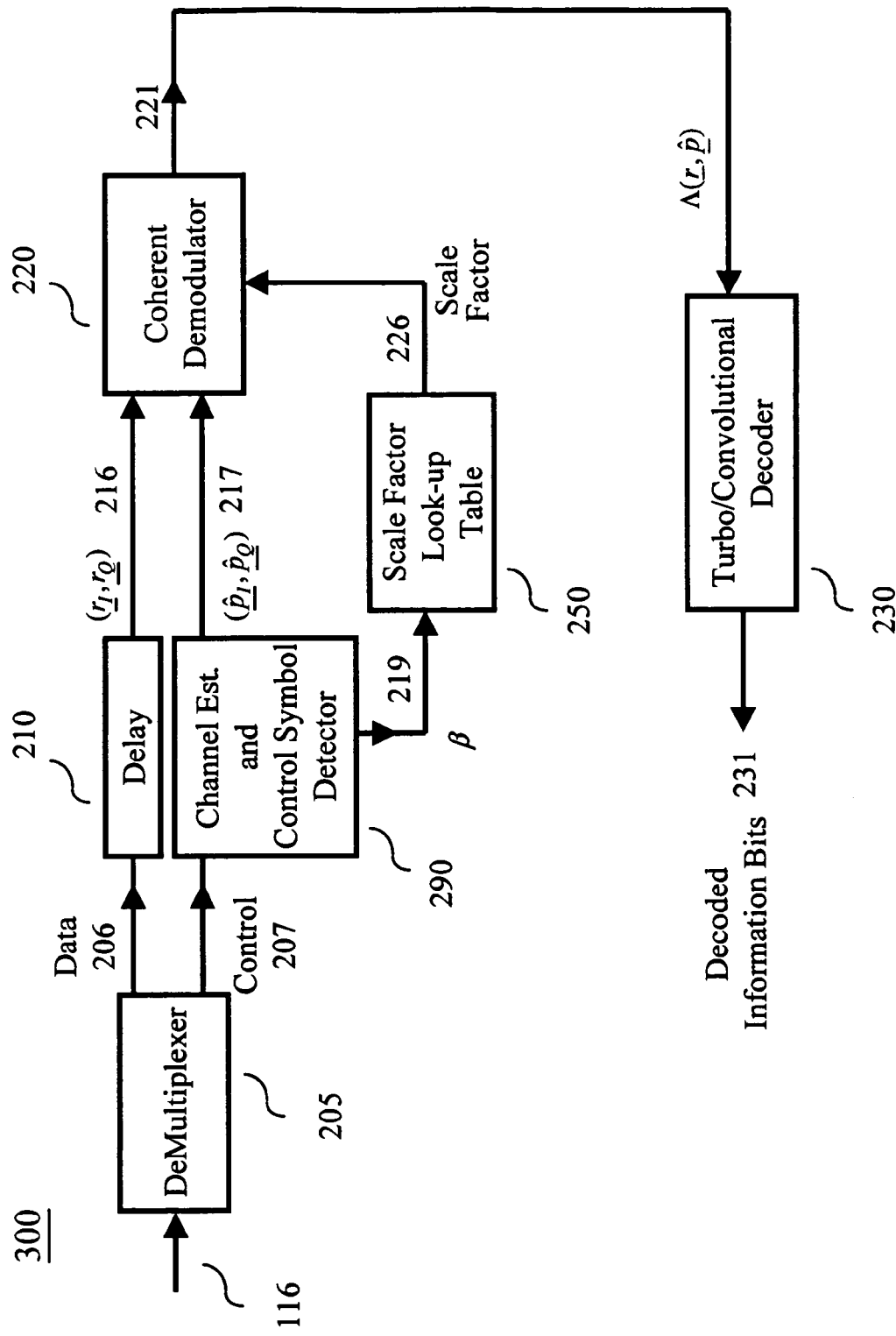
FIG. 4 shows another block diagram of a receiver in accordance with the principles of the invention.

When the scale factors are independent of the multipath index as embodied in equation (9), an alternative look-up table implementation may be used, where a priori values are determined (e.g., as described earlier)) for $\sigma_N^2$, and G in order to determine w from equation (9) in advance. Such an illustrative look-up table is shown in FIG. 3, which assumes that $\sigma_N^2$, and G are independent of the multipaths i, as is usually the case. This look-up table has been constructed assuming that $\sigma_N^2=2$ and G=0.01. The look-up table a priori associates values of $\beta$ with values for the associated scale factor. As can be observed from FIG. 3, the value of the square root of 18 is used as the index to the value of the scale factor. A receiver 300 representing such an implementation is shown in FIG. 4. This receiver is identical to the receiver shown in FIG. 2 other than the use of scale factor look-up table 250 and the combination of the channel estimation element with the control signal detector (as represented by element 290). For simplicity, elements relating to the other fingers (such as a combiner, etc., as shown in FIG. 2) are not shown. As such, only that portion of the receiver is described. Channel estimation and control symbol detector element 290 provides a value for $\beta$ (or, alternatively, a value representing the square root of $\beta$), via signal 219, to scale factor look-up table 250. The latter calculates, if necessary, the value for the square root of $\beta$ and retrieves the associated value for the scale factor from a memory array (not shown) which implements the look-up table. (Obviously, if calculating a square root, then either another look-up table is used for square root values and/or scale factor look-up table 250 also comprises a stored-program-controlled processor (not shown).) The value of the retrieved scale factor is provided, via signal 226, to coherent demodulator 220 for use in determining the LLR, as described above.

Figure 5:
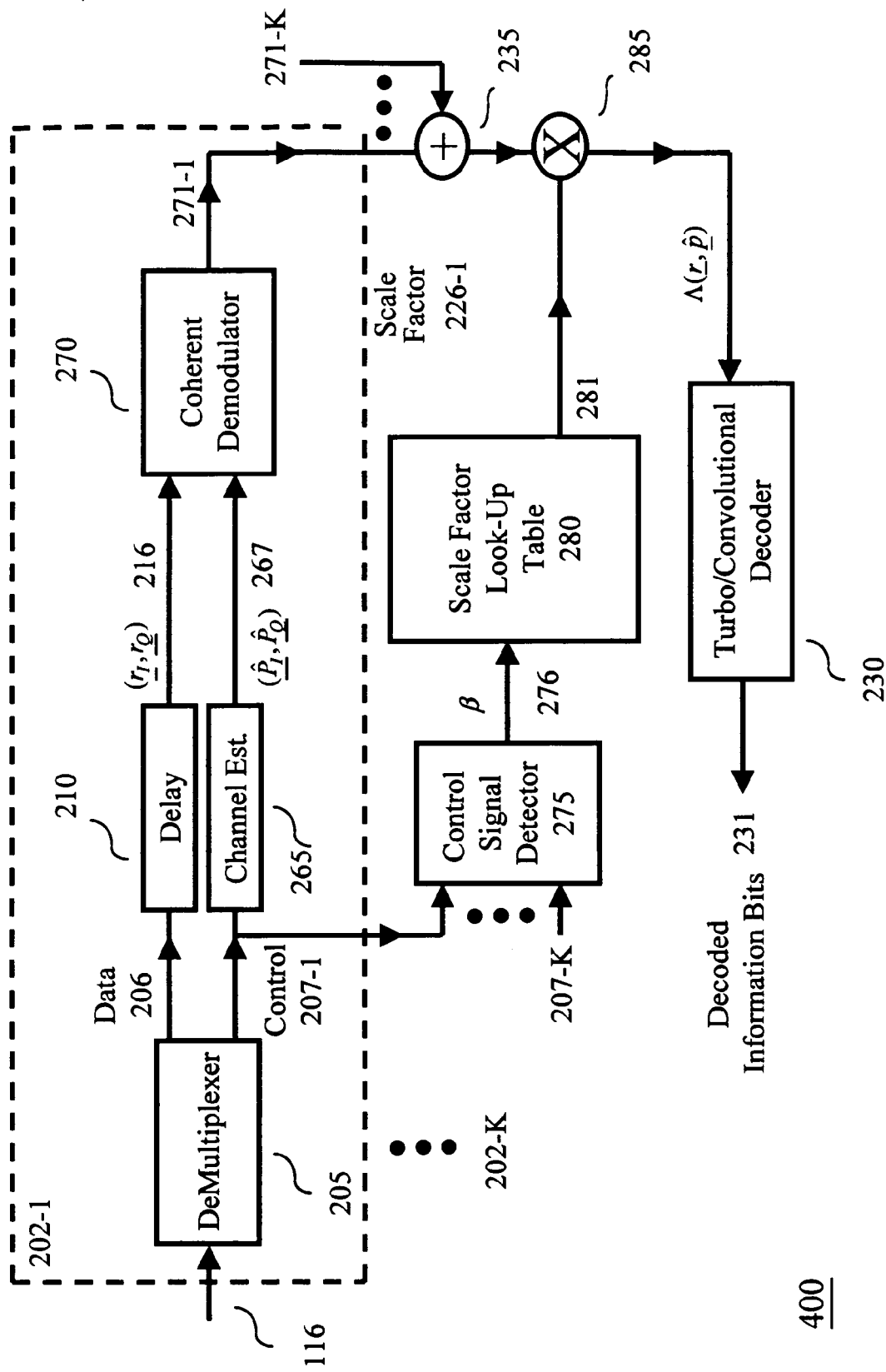
FIG. 5 shows another block diagram of a receiver in accordance with the principles of the invention.

Another embodiment of the inventive concept is shown in FIG. 5. Receiver 400 is similar to receiver 200 of FIG. 2 except for signal detector 275, scale factor look-up table 280 and multiplier 285. In the embodiment of FIG. 5, control signal detector 275 combines the control signal portion from each finger of a RAKE receiver (as represented by 202-1 through 202-2, with respective control signal portions 207-1 through 207-K) to provide a single value for β (or, alternatively, a value representing the square root of β), via signal 276, to scale factor look-up table 280. The latter calculates, if necessary, the value for the square root of β and retrieves the associated value for the scale factor from a memory array (not shown) which implements the look-up table. (Obviously, if calculating a square root, then either another look-up table is used for square root values and/or scale factor look-up table 280 also comprises a stored-program-controlled processor (not shown).) The value of the retrieved scale factor is provided, via signal 281, to multiplier 285, which multiples the combined LLR provided by combiner 235 to provide a resultant LLR for use by turbo/convolutional decoder 230.

It should be observed, that in either receiver approach described above, there is no need to compute or estimate the number and relative strengths of the multipaths, nor does the fading distribution need to be known. β is identical for all multipaths.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although described in the context of optimum demodulation of PSAM signals, the inventive concept is applicable to other pilot signal based schemes (such as, but not limited to, the one used in the North America CDMA 2000 standard). Indeed, the inventive concept is not restricted to CDMA. Further, although shown as a separate elements, any or all of the elements of FIGS. 1, 2, 4 and 5 (e.g., coherent demodulator 220) may be implemented in a stored-program-controlled processor.

What is claimed:

1. A wireless receiver comprising:
a receiver for receiving a wireless signal comprising pilot symbols and data symbols; and
a demodulator for generating a log-likelihood ratio as a function of a scale factor;
wherein the scale factor is stored in a look-up table such that an index into the look-up table used in retrieving the scale factor is a function of a noise variance of the received pilot symbols of the wireless signal.

2. The wireless receiver of claim 1 wherein the scale factor is determined independently of relative strengths and number of multipaths in the received wireless signal.

3. The wireless receiver of claim 1 further comprising a processor for determining the scale factor as a function of the noise variance of the received pilot symbols of the received wireless signal.

4. The wireless receiver of claim 3 wherein the scale factor is determined independently of relative strengths and number of multipaths in the received wireless signal.

5. The wireless receiver of claim 3 wherein the processor further determines the scale factor as a function of the noise variance of the received pilot symbols and a noise variance of the received data symbols of the received wireless signal.

6. The wireless receiver of claim 1 further comprising a memory for storing the look-up table.

7. The wireless receiver of claim 1 wherein the receiver comprises a demultiplexer for providing a data signal, representing the data symbols, and a control signal, representing the pilot symbols.

8. The wireless receiver of claim 7 wherein the receiver comprises a control signal detector for recovering from the control signal a value for a ratio between the energy per pilot symbol to the energy per data symbol.

9. The wireless receiver of claim 1 wherein the index into the look-up table used in retrieving the scale factor is a function of the noise variance of the received pilot symbols and a noise variance of the received data symbols of the received wireless signal.

10. A wireless receiver comprising:
a memory for storing a look-up table, such that an index into the look-up table for retrieving a scale factor associated with a log-likelihood ratio is a function of a noise variance of received pilot symbols of a wireless signal which comprises the pilot symbols and data symbols; and
a decoder, responsive to a signal modified by the retrieved scale factor, for decoding a received form of the wireless signal.

11. The wireless receiver of claim 10 wherein the scale factor is determined independently of relative strengths and number of multipaths in the received form of the wireless signal.

12. The wireless receiver of claim 10 further comprising a control signal detector for recovering from the received form of the wireless signal a value for a ratio between the energy per pilot symbol to the energy per data symbol.

13. The wireless receiver of claim 10 wherein the index for retrieving the scale factor is a function of the noise variance of the received pilot symbols and a noise variance of the received data symbols.

14. A wireless receiver comprising:
a memory for storing a look-up table, wherein one column of the look-up table comprises values that are a function of a noise variance of received pilot symbols of a wireless signal which comprises the pilot symbols and data symbols, and a second column of the look-up table provides associated values of a scale factor; and
a demodulator, responsive to retrieved values of the scale factor, for demodulating a received form of the wireless signal and generating a log-likelihood ratio as a function of the scale factor.

15. The wireless receiver of claim 14 wherein the scale factor values of the look-up table are determined independently of relative strengths and number of multipaths in the received form of the wireless signal.

16. The wireless receiver of claim 14 further comprising a control signal detector for recovering from the received form of the wireless signal a value for a ratio between the energy per pilot symbol to the energy per data symbol for use by the memory.

17. The wireless receiver of claim 14 wherein the one column of the look-up table further comprises values that are a function of the noise variance of the received pilot symbols and a noise variance of the received data symbols.

18. A wireless receiver comprising:
a demodulator for demodulating a received wireless signal comprising pilot symbols and data symbols; and
a processor for determining a scale factor using a look-up table such that an index into the look up table is a function of a noise variance of the received pilot symbols of the wireless signal, and for providing the determined scale factor to the demodulator for use in demodulating a received form of the wireless signal; and wherein the demodulator generates a log-likelihood ratio as a function of the scale factor.

19. The wireless receiver of claim 18 wherein the scale factor is determined independently of relative strengths and number of multipaths in the received wireless signal.

20. The wireless receiver of claim 18 wherein the index is a function of a noise variance in the received data symbols of the received form of the wireless signal, and the noise variance in the received pilot symbols of the received form of the wireless signal.

* * * * *